(12) United States Patent
Hill

(10) Patent No.: US 11,107,593 B2
(45) Date of Patent: Aug. 31, 2021

(54) DEPRESSURIZATION AND COOLING SYSTEM FOR A CONTAINMENT OF A NUCLEAR POWER PLANT CONTAINMENT PROTECTION SYSTEM AND NUCLEAR POWER PLANT

(71) Applicant: FRAMATOME GMBH, Erlangen (DE)

(72) Inventor: Axel Hill, Stockstadt (DE)

(73) Assignee: Framatome GmbH, Erlangen (DE)

( * ) Notice: Subject to any disclaimer, the term of this patent is extended or adjusted under 35 U.S.C. 154(b) by 595 days.

(21) Appl. No.: 15/974,065

(22) Filed: May 8, 2018

(65) Prior Publication Data

US 2018/0261340 A1 Sep. 13, 2018

Related U.S. Application Data

(63) Continuation of application No. PCT/EP2015/076106, filed on Nov. 9, 2015.

(51) Int. Cl.
| | | |
|---|---|---|
| *G21C 9/012* | (2006.01) | |
| *F28B 9/06* | (2006.01) | |
| *G21C 15/18* | (2006.01) | |
| *F28D 21/00* | (2006.01) | |
| *F25B 9/04* | (2006.01) | |

(52) U.S. Cl.
CPC ............ *G21C 9/012* (2013.01); *F25B 9/04* (2013.01); *F28B 9/06* (2013.01); *G21C 15/18* (2013.01);
(Continued)

(58) Field of Classification Search
CPC .......... G21C 9/012; G21C 9/06; G21C 9/004; G21C 9/00; G21C 9/04; G21C 15/18; G21C 15/185; G21C 15/182; G21C 15/24; G21C 15/253; G21C 15/243; G21C 15/257; G21C 15/28; F25B 9/04; F25B 11/02; F25B 19/005; F25B 37/00; F25B 41/04; F25B 41/043; F25B 39/00; F25B 39/02; F25B 39/04; F28B 9/06; F28B 9/08; F28B 9/10;
(Continued)

(56) References Cited

U.S. PATENT DOCUMENTS 4,293,384 A   10/1981   Weber
4,513,573 A *  4/1985   Funk ..................... C10J 3/06
                                                       60/648
(Continued)

FOREIGN PATENT DOCUMENTS

DE     102011107284 A1    1/2013
WO     WO-2013004351 A1 *  1/2013  ............... G21D 5/00
(Continued)

*Primary Examiner* — Darlene M Ritchie
(74) *Attorney, Agent, or Firm* — Laurence A. Greenberg; Werner H. Stemer; Ralph E. Locher

(57) ABSTRACT

A depressurization and cooling system for steam and/or condensable gases located in a containment. The system contains a steam condenser having an upstream port connected to the containment through an exhaust line and a downstream port connected to the containment through a backfeed line. The backfeed line contains a backfeed compressor. A re-cooling system for re-cooling the steam condenser is provided. The depressurization and cooling system is effective for re-cooling of the steam condenser. Accordingly, this is achieved as the re-cooling system is self-sustainable.

19 Claims, 4 Drawing Sheets

(52) U.S. Cl.
 CPC .. *F28D 2021/0054* (2013.01); *F28F 2265/12* (2013.01); *G21C 15/185* (2019.01); *Y02E 30/30* (2013.01)

(58) Field of Classification Search
 CPC ............. Y02E 30/30; F28D 2021/0054; F28D 2021/0019; F28F 2265/12; F01K 9/003; F01K 23/04; F22G 5/00; F22G 7/14
 USPC ................................ 60/655; 122/460, 479.1
 See application file for complete search history.

(56) References Cited

U.S. PATENT DOCUMENTS

| | | | | |
|---|---|---|---|---|
| 7,132,085 | B2 * | 11/2006 | Eckardt | B01J 10/007 422/168 |
| 9,410,535 | B2 * | 8/2016 | Yamashita | F28F 9/22 |
| 2013/0133327 | A1 * | 5/2013 | Milam | F01K 23/04 60/651 |
| 2015/0200022 | A1 | 7/2015 | Hill et al. | |
| 2015/0275698 | A1 * | 10/2015 | Kawai | F01K 23/101 60/604 |
| 2016/0005498 | A1 * | 1/2016 | Gautier | F01L 15/10 376/384 |
| 2016/0237859 | A1 * | 8/2016 | Malinin | F01K 15/00 |

FOREIGN PATENT DOCUMENTS

| | | | | |
|---|---|---|---|---|
| WO | 2014019770 | A1 | 2/2014 | |
| WO | 2014020091 | A1 | 2/2014 | |
| WO | WO-2014020091 | A1 * | 2/2014 | ............. G21C 9/016 |

\* cited by examiner

DEPRESSURIZATION AND COOLING SYSTEM FOR A CONTAINMENT OF A NUCLEAR POWER PLANT CONTAINMENT PROTECTION SYSTEM AND NUCLEAR POWER PLANT

CROSS-REFERENCE TO RELATED APPLICATION

This is a continuation application, under 35 U.S.C. § 120, of copending international application No. PCT/EP2015/076106, filed Nov. 9, 2015, which designated the United States; the prior applications are herewith incorporated by reference in their entirety.

BACKGROUND OF THE INVENTION

Field of the Invention

The present invention relates to a depressurization and cooling system for a containment of a nuclear power plant.

A depressurization and cooling system is known from the international patent disclosure WO 2014/019770 A1, corresponding to U.S. patent publication No. 2015/0200022. The whole system in connection with the containment is also known as a containment protection system. It facilitates depressurization of the containment atmosphere in the case of a severe accident.

Hence, the known containment protection contains an exhaust line for an exhaust stream being connected to the containment, with a steam condenser being switched into the exhaust line, a backfeed line for the gaseous portion of the exhaust stream leading from the steam condenser to the containment, with a backfeed compressor being switched into the backfeed line, and re-cooling of the steam-condenser by liquid nitrogen vaporization.

Steam and condensable gases contained in the exhaust stream are condensed in a steam condenser. Afterwards, the depressurized gaseous portion of the exhaust stream is fed back into the containment via a backfeed line, into which a backfeed compressor is switched in order to overcome the pressure gradient. The condensate which accumulates in the steam condenser may also get fed back into the containment in a similar manner.

During operation large amounts of heat may gather in the steam condenser, thereby reducing its capacity to act as a heat sink and thus negatively affecting the condensation process.

The known re-cooling of the steam condenser by liquid nitrogen vaporization needs large amounts of stored nitrogen which is costly and space-consuming.

SUMMARY OF THE INVENTION

The objective of the invention is to enable effective and reliable re-cooling of the steam condenser in a depressurization and cooling system or containment protection system specified above.

According to the invention this objective is achieved by a depressurization and cooling system with the features of the main claim.

Advantageous embodiments are specified in the dependent claims and in the subsequent detailed description.

Hence, a key feature of the claimed system is a self-sustaining cooling circuit for re-cooling the steam condenser. The cooling circuit preferably contains a first heat exchanger being thermally coupled to the steam condenser, an expansion engine, a compressor pump, and a second heat exchanger being thermally coupled to a heat sink. The expansion engine powers the compressor pump.

In this way passive re-cooling of the steam condenser is achieved, based on the principle of recuperation and utilization of the energy contained in the exhaust stream. The whole cooling circuit works in an autonomous manner, even during startup.

In a preferred embodiment the cooling circuit contains a superheater in the cooling circuit between the first heat exchanger and the expansion engine, wherein the superheater is thermally coupled to the exhaust line such that it is heated by the exhaust stream. Thereby, the temperature of the cooling medium is increased before it enters the expansion engine, and thus the yield of the expansion engine is increased with the drawback of introducing additional heat into the cooling circuit.

In a particular advantageous embodiment this drawback can be compensated for by switching a vortex cooler or vortex tube in the cooling circuit between the compression pump and the first heat exchanger. A vortex tube is a completely passive cooling device, preferably without moving parts. In the present context it removes the excess heat which is introduced into the cooling circuit by the superheater. Thus, the temperature difference between the cold section and the hot section of the cooling circuit is increased and the overall cooling efficiency is improved.

In a preferred embodiment, a recombiner unit is switched into the exhaust line upstream of the steam condenser. The recombiner unit preferably contains a passive autocatalytic recombiner and facilitates flameless recombination of hydrogen contained in the exhaust stream with oxygen, thereby producing water vapor or steam. Alternatively or additionally, the recombiner may be configured for catalytic recombination of carbon monoxide with oxygen to carbon dioxide.

In an expedient embodiment, the cooling circuit is configured for the circulation of a cooling medium in a supercritical state.

Advantageously, the circulating cooling medium in the cooling circuit has a boiling temperature below 100° C., preferably below 80° C. This supports startup and self-sustained operation of the cooling circuit even when the driving temperature difference between heat source and heat sink is comparatively low.

A particularly suitable cooling medium is carbon dioxide.

In a preferred embodiment the expansion engine in the cooling circuit is a steam turbine.

In another preferred embodiment the expansion engine and the compressor pump are mechanically coupled to each other, preferably via a common shaft.

In yet another preferred embodiment the expansion engine also powers a blower, the blower being directed to the air cooler. Thus, the cooling capacity of the air cooler is improved.

Preferably, the expansion engine also powers, at least partially, the backfeed compressor.

The whole containment protection system is preferably configured for zero-release of radioactive substances into the environment. Rather, the gaseous part and preferably also the condensed liquid part of the exhaust stream are fed back into the containment. In contrast to existing systems there is by default no venting into the outer atmosphere (but can still be available as an option).

All in all, the depressurization and cooling system/containment protection system according to the invention facilitates removal of the nuclear decay heat after severe accidents and pressure relief of the containment without release of radioactive fission products into the environment. Even during severe accidents the negative causes are limited to the plant and there is no impact (radioactive contamination) to the environment. The nuclear energy content of the containment (decay heat) as well as the energy content of the combustible gases (H2, CO) is used for a passive and self-containing process/system to maintain the containment integrity over a long time without external supply of energy and cooling media. The passive cooling cycle with generation of a power surplus can be used for many other applications where passive heat removal and cooling is required.

Exemplary embodiments of the invention are subsequently illustrated with reference to the enclosed drawings.

Other features which are considered as characteristic for the invention are set forth in the appended claims.

Although the invention is illustrated and described herein as embodied in a depressurization and a cooling system for a containment of a nuclear power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
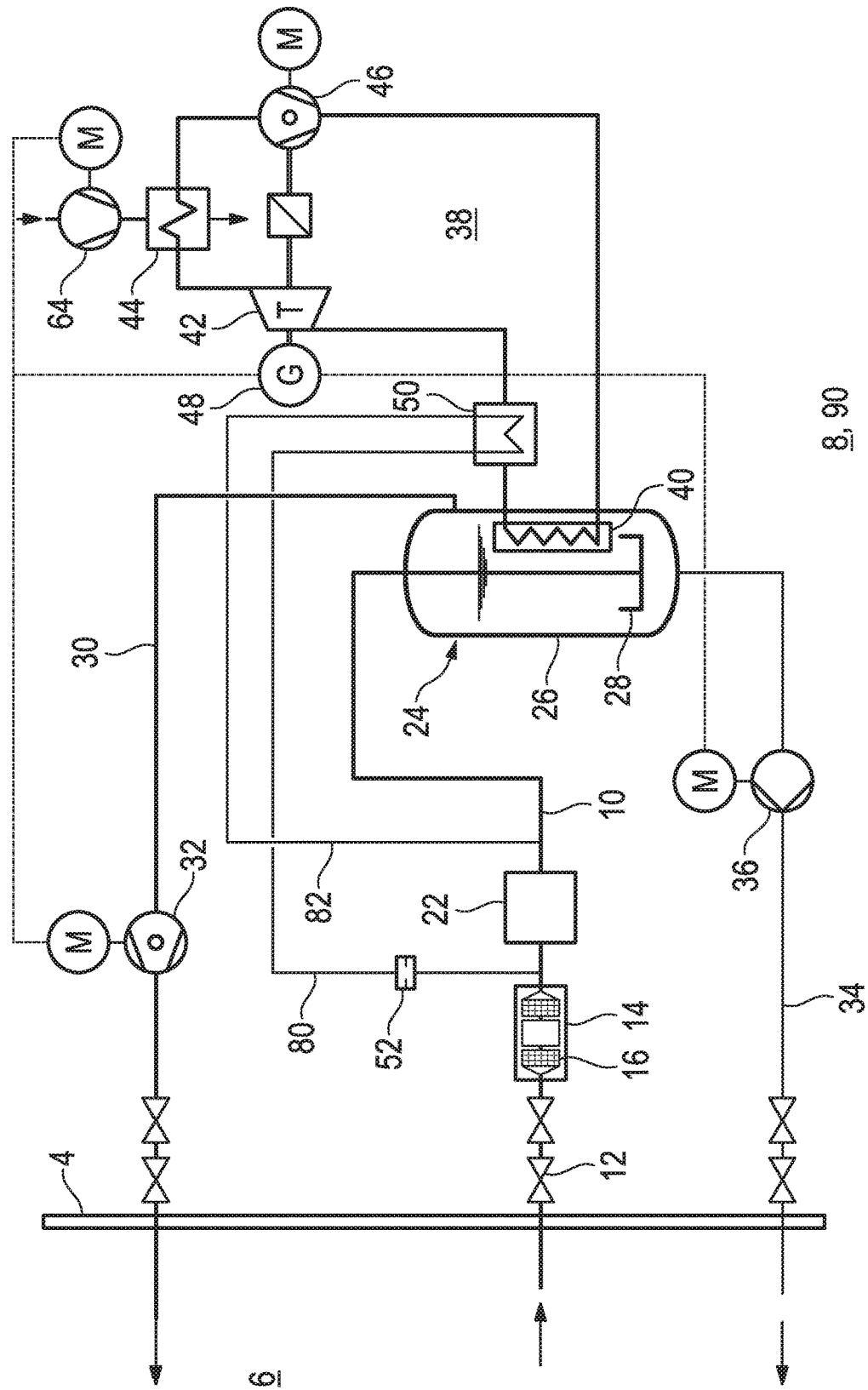
FIG. 1 is a simplified schematic diagram of a first variant of a plant protection system according to the invention.

Referring now to the figures of the drawings in detail and first, particularly to FIG. 1 thereof, there is shown a nuclear power plant 2, only a part of which is seen here, comprises a containment wall 4 which encloses a reactor pressure vessel (not shown) and related components of a nuclear cooling circuit. The containment wall 4 is configured, in any emergency, to contain the escape of radioactive steam or gas up to a maximum pressure. The area inside the containment wall 4 is also known as containment 6.

If the pressure inside the containment 6 exceeds a critical value, typically in the range of 1 to 3 bar relative to the atmospheric pressure, a containment protection system 8 facilitates depressurization. To this end, the containment protection system 8 contains an exhaust line 10 for an exhaust stream. The exhaust line 10 has an inlet aperture inside the containment 6 and leads through the containment wall 4. During normal operation of the nuclear power plant 2 it is closed by at least one shut-off valve 12 which is preferably located shortly after the containment wall 4. To enable depressurization of the containment 6, the shut-off valve 12 gets opened such that the exhaust stream sets in, driven by the pressure difference between the containment 6 and the low-pressure part of the exhaust line 12, where the pressure essentially equals atmospheric pressure. The mass flow rate of the exhaust stream may typically reach values of 2 to 10 kg/s, depending on the post-accident decay-heat in the containment (ca. 10 to 20 MW decay-heat power in a 1000 to 1600 MW power plant).

Typically, the exhaust stream contains hydrogen (share for example>4%) which in combination with oxygen might form an explosive gas mixture and hence put the whole facility at risk. Therefore, a recombiner unit 14, preferably with a number of passive autocatalytic recombiners, is switched into the exhaust line 10 in order to convert hydrogen and oxygen into harmless water vapor or steam. Alternatively or additionally, there are catalytic recombiners for converting carbon monoxide and oxygen into carbon dioxide. Due to the exothermic nature of the recombination process the exhaust stream gets heated and typically reaches temperatures in the range of 400° C. to 800° C. Thereby, steam portions contained in the exhaust stream are overheated in an approximately isobaric process.

The recombiner unit 14 may be located in a section of the exhaust line 10 within the containment 6, but the preferred location is outside the containment 6 directly after the containment wall 4. This will avoid unduly high temperatures at the lead-through at the containment wall 4.

Flame arrestors 16 at the entry of the recombiner unit 14 prevent the spreading of an accidental ignition of the gas mixture from the containment 6 into the containment protection system 8 or vice versa.

Figure 3:
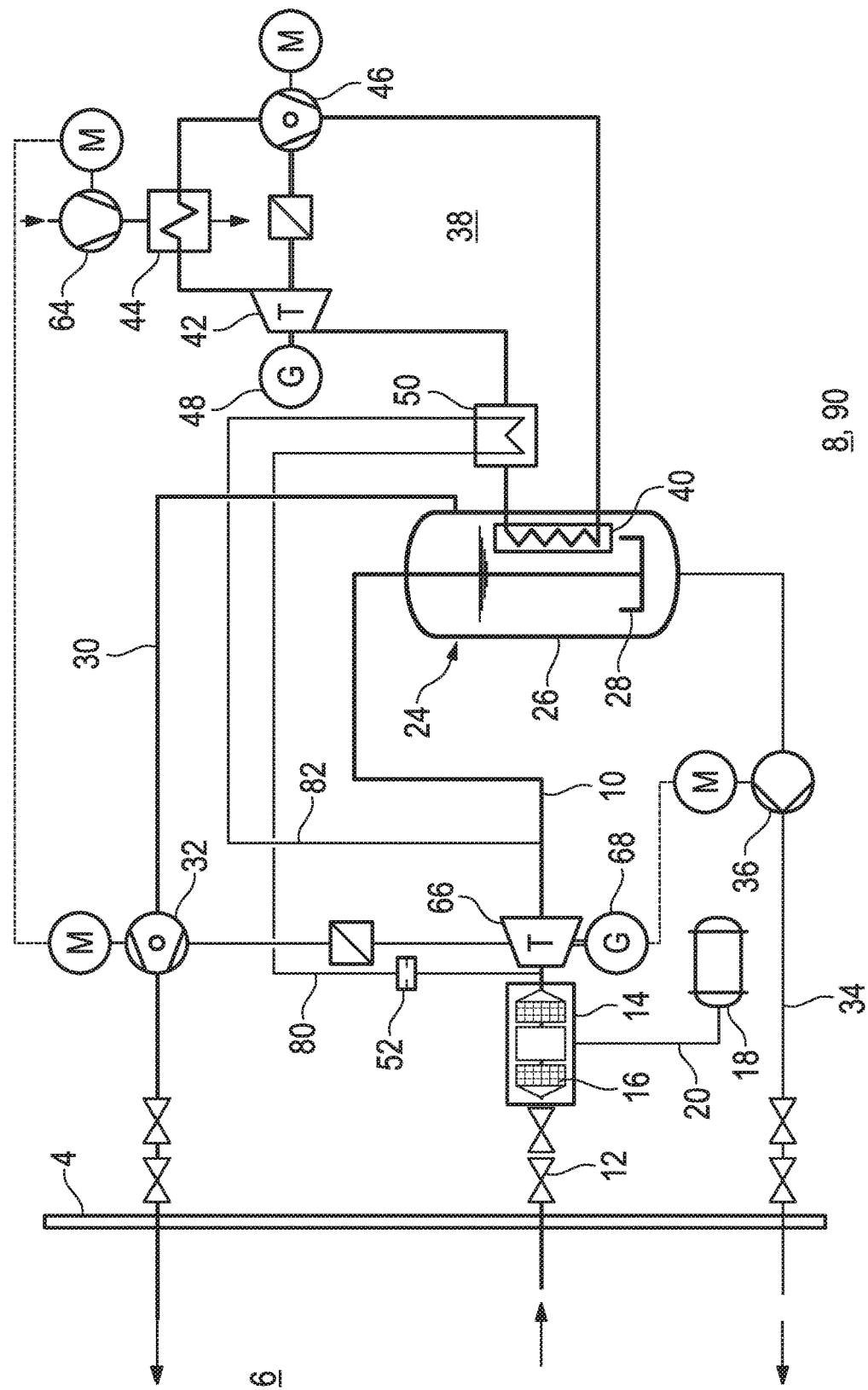
FIG. 3 is a simplified schematic diagram showing a third variant of the plant protection system.

Optionally, a storage container 18 for oxygen is connected to exhaust line 10 or to the recombiner unit 14 via a feeding line 20 in order to enrich the exhaust stream with oxygen if necessary/beneficial for the subsequent recombination process (see FIG. 3).

Downstream the recombiner unit 14, the exhaust stream may be led through an (optional) filter unit 22, for example a particle filter and/or a sorbent filter.

Further downstream, the exhaust stream is led into a steam condenser 24 in which the steam portion within the exhaust stream is condensed into the liquid state of matter. There is a pressure relief involved with the condensation. The steam condenser 24 has a container 26 in which the liquid condensate accumulates in the bottom region. The incoming exhaust stream is preferably injected into the liquid phase via a number of injections nozzles 28 (yielding direct condensation), such that the device also acts as a washer or wet scrubber for the gaseous constituents. At the beginning of the vent process, when there is no condensate yet, the container 26 may be at least partially filled with an initial inventory of (auxiliary) cooling liquid.

The non-condensable gaseous portion of the exhaust stream accumulates in a gas space in the top region of the container 26 above the liquid phase. From there it is led back into the containment 6 via a backfeed line 30 into which a backfeed compressor 32 is switched in order to overcome the pressure differential.

Another backfeed line 34 which is attached to the bottom of the container 26 allows for feeding the liquid condensate back into the containment 6 by virtue of a backfeed pump 36.

For the purpose of re-cooling the steam condenser 24 there is a self-sustaining cooling circuit 38 which contains a first heat exchanger 40, an expansion engine 42, a second heat exchanger 44, and a compressor pump 46.

The first heat exchanger 40 is thermally coupled to the steam condenser 24 and acts as a heater for the cooling medium/heat transfer medium which circulates in the cooling circuit 38. Preferably, the first heat exchanger 40 is arranged inside the container 26 in a region which is normally filled with liquid during exhaust/vent operation of the containment protection system 8. In other words, the first heat exchanger 40 preferably immerges into the liquid which accumulates in the steam condenser 24 and which acts a heat source.

The expansion engine 42 which is located downstream of the first heat exchanger 40 in the cooling circuit 38 is preferably a steam turbine. The heated cooling medium expands in the expansion engine 42 such that heat energy is converted into mechanical work.

Further downstream, there is a second heat exchanger 44 which in connection with the surrounding environment acts as a cooler for the expanded cooling medium. It is preferably realized as an air cooler. That is, excess heat contained in the cooling medium is transferred to the surrounding atmosphere/environment which act as a heat sink.

Further downstream, the expanded and re-cooled cooling medium then passes the compressor pump 46, preferably of a turbo-compressor type, which drives the cooling circuit 38 according to the principle of forced circulation.

The cooling medium is then led into the first heat exchanger 40 again and hence the cooling circuit 38 is closed.

The cooling circuit 38 thus forms a closed thermodynamic cycle, which is effectively driven by the heat difference between the first heat exchanger 40 which is thermally coupled to the steam condenser 24 (typical temperature: 90° C.) and the second heat exchanger 44 which is thermally coupled to the environment (typical temperature: 20 to 40° C.).

In a possible realization the cooling circuit 38 is a two-phase circuit in which the first heat exchanger 40 (heater) acts as an evaporator for the cooling medium and the second heat exchanger 44 (cooler) acts as a condenser. In this case the cooling medium preferably has a boiling temperature below 100° C., more preferably below 80° C., in order to adapt to the typical temperature range of the heat source in the steam condenser 24.

In a preferred embodiment, however, the cooling circuit 38 is configured for the circulation of a cooling medium/fluid in a super-critical state. A suitable cooling medium for this purpose is, for example, carbon dioxide ($CO_2$) with a critical temperature of 31.0° C. and a critical pressure of 73.8 bar. That is, the cooling circuit 38 must be configured to withstand such high pressures above the critical pressure. The super-critical mode of operation is advantageous because of the high density of the cooling medium in this state with correspondingly high heat transfer capacity and yet high fluidity within the line system of the cooling circuit 38.

Figure 4:
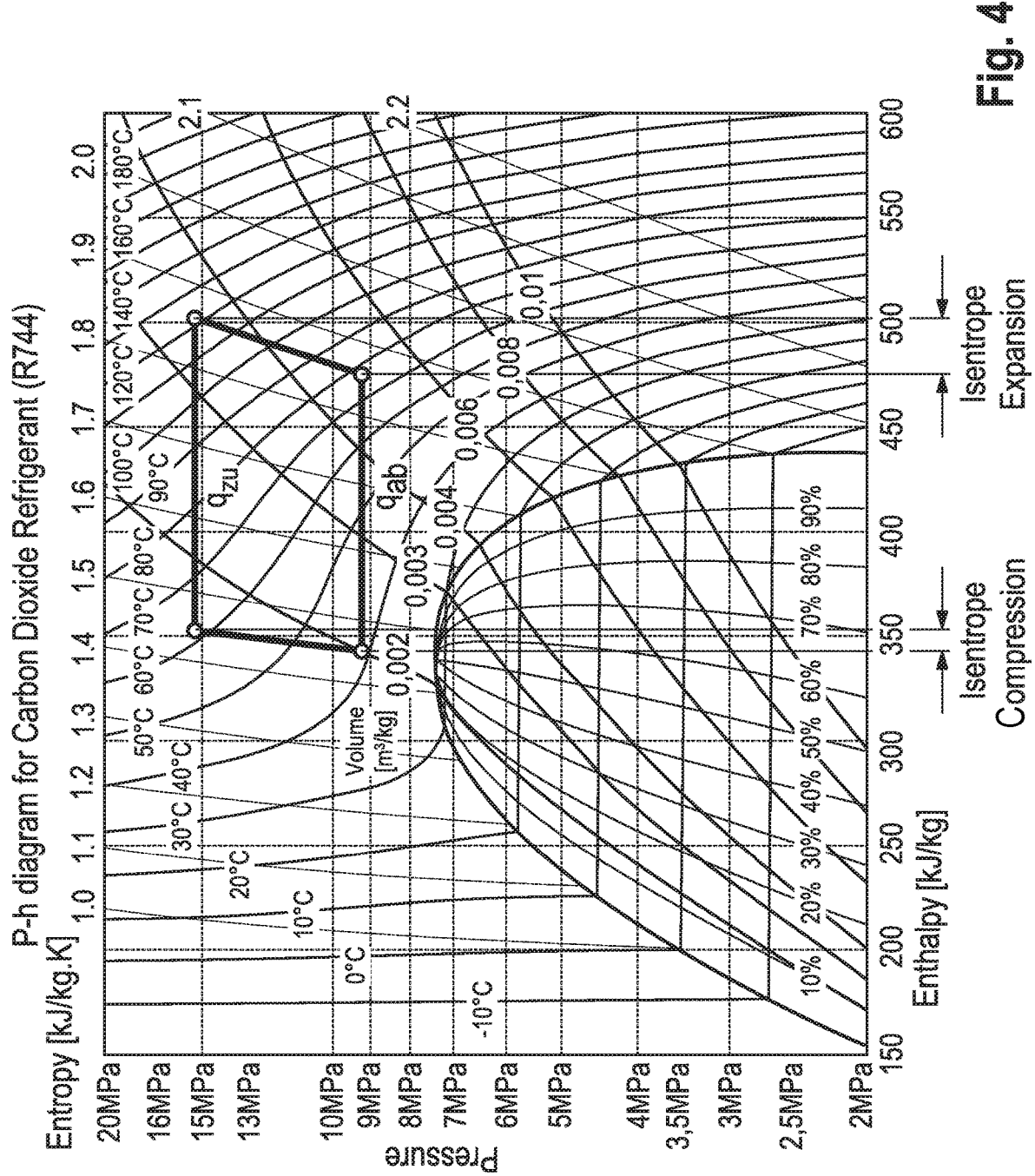
FIG. 4 is a diagrammatic representation of a thermodynamic process employed in the plant protection system.

The underlying Joule process for a super-critical fluid, here a carbon dioxide based refrigerant, is visualized in the diagram of FIG. 4, wherein pressure p is plotted over enthalpy h (p-h diagram). Expansion of the fluid in the expansion engine 42 and compression by virtue of the compressor pump 46 are approximately isentropic processes, while heating and cooling in the corresponding heat exchangers 40, 44 are approximately isobaric processes. This kind of process control is particularly suitable for a high yield of usable excess energy.

Turning back to FIG. 1 now, for a self-sustained operation of the cooling circuit 38 the expansion engine 42 powers the compressor pump 46. This is preferably achieved as the expansion engine 42 and the compressor pump 46 are mechanically coupled to each other, preferably via a common shaft, and if necessary with a transmission gearing in between. However, other variants are possible as well, for example via generation of electrical energy with the help of an electrical generator 48. The generated electricity would then drive the motor of the compressor pump 46. If necessary, temporary storage of the electrical energy can take place in suitable storage units like accumulators.

For an efficient operation an additional heat exchanger 50 is switched into the cooling circuit downstream to the first heat exchanger 40 and upstream 38 to the expansion engine 42. On the secondary side the heat exchanger 50 is connected to the hot part of the exhaust line 10 between the recombiner unit 14 and the steam condenser 24 such that a branch stream of the hot exhaust stream serves as a heating medium. A dedicated throttle valve 52 (see FIG. 2) in the exhaust line 10 and/or a filter unit 22 (see FIG. 1) and/or another device like a steam turbine 66 (see FIG. 3) acting as a throttle allows for back-feeding of the branch stream into the main exhaust stream before the steam condenser 24 without active driving means. This means that the feeding line 80 for the heat exchanger 50 branches of from the exhaust line 10 prior to the throttle section, and the return line 82 unites with the exhaust line 10 after the throttle section (as viewed in the direction of the exhaust stream).

Thus, the additional heat exchanger 50 acts as recuperative superheater for the cooling medium circulating in the cooling circuit 38 before it enters the expansion engine 42. Thereby, the yield of the expansion engine 42 is increased, albeit with the potential drawback of introducing additional heat into the cooling circuit 38.

Figure 2:
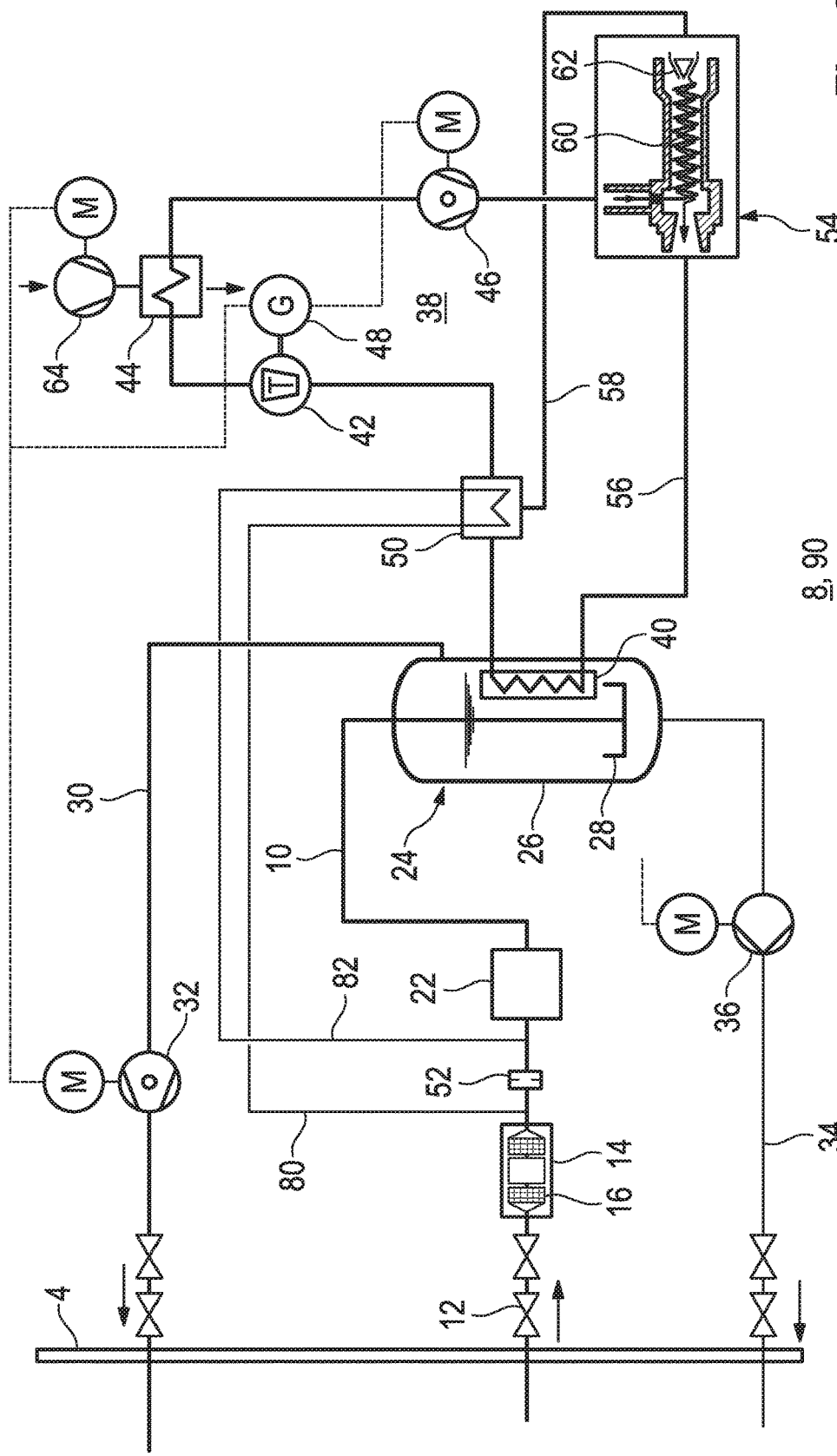
FIG. 2 is a simplified schematic diagram of a second variant of the plant protection system.

In a preferred embodiment shown in FIG. 2 a vortex cooler 54 is installed downstream the compressor pump 46 in order to further cool down the cooling medium before it re-enters the first heat exchanger 40 within the primary heat source. A vortex cooler 54 or vortex tube is a mechanical device without moving parts that separates a fluid stream into hot and cold branch streams by virtue of a vortex flow. The cold stream then enters the first heat exchanger 40 via cold fluid line 56, and the hot branch stream is re-injected into the main cooling loop just before or at the superheater 50 via hot fluid line 58. It has been found that in this way the above mentioned drawback can be compensated for or eliminated and the overall cooling efficiency of the system be improved.

Within the vortex tube pressurized fluid is injected tangentially into a swirl chamber 60 and accelerated to a high rate of rotation. Due to the conical nozzle 62 at the end of the tube, only the outer shell of the compressed fluid is allowed to escape at that end. The remainder of the fluid is forced to return in an inner vortex of reduced diameter within the outer vortex. The cooling efficiency of the device is rather low, but the device is completely passive without moving parts.

In a preferred embodiment indicated both in FIGS. 1 and 2, the expansion engine 42 also powers a blower 64 which is directed to the second heat exchanger 44 (aka air cooler) in order to improve its cooling efficiency. This can either be achieved by a mechanical coupling or indirectly via electrical energy generated by the generator 48, as indicated in the figures.

In a similar manner, the expansion engine 42 may also power, at least partially, the backfeed compressor 32 and/or the backfeed pump 36.

The variant of the containment protection system shown in FIG. 3 differs from the one shown in FIG. 1 in that there is a steam turbine 66 switched into the exhaust line 10 between the recombiner unit 14 and the steam condenser 24. The steam turbine 66 converts a portion of the heat energy contained in the exhaust stream into mechanical work (approximately isentropic expansion) in order to drive, at least partially, the backfeed compressor 32 and/or the backfeed pump 36. This is achieved, for example, directly via mechanical coupling of the steam turbine 66 with the backfeed compressor 32 and/or the backfeed pump 36 and/or indirectly via generation of electrical energy by an electrical generator 68. It is also possible to have a turbine-compressor-generator unit on a single shaft. If necessary, temporary storage of the electrical energy can take place in suitable storage units like accumulators.

Furthermore, the mechanical and/or electrical power generated by the steam turbine 66 can be used to drive, at least partially, the compressor pump 46 and/or the blower 64 of the cooling circuit 38.

Generally, the available excess energy will depend on the hydrogen portion contained in the exhaust stream and on the necessary power for the backfeed compressor 32, which in turn depends on the pressure difference between containment 6 and steam condenser 24 during vent operation.

In the embodiment according to FIG. 3 the feeding line 80 for the superheater 50 is attached to the exhaust line 10 upstream of the steam turbine 66, while the return line 82 is attached downstream.

The vortex cooler 54 known from FIG. 2 can of course also be used in the embodiment according to FIG. 3 in the same way.

If the available space inside the containment 6 is large enough, the whole containment protection system 8 or parts of it can be installed inside the containment 6.

The parts of the containment protection system 8 which are directed at depressurization and cooling are also known as the depressurization and cooling system 90.

As is evident from the previous description, various aspects of each of the figures may be combined with various aspects of the other figures.

The nuclear power plant can be of any known type, such as BWR, PWR, WWER, HWR, HTR.

The following is a summary list of reference numerals and the corresponding structure used in the above description of the invention:
2 power plant
4 containment wall
6 containment
8 containment protection system
10 exhaust line
12 shut-off valve
14 recombiner unit
16 flame arrestor
18 storage container
20 feeding line
22 filter unit
24 steam condenser
26 container
28 nozzle
30 backfeed line
32 backfeed compressor
34 backfeed line
36 backfeed pump
38 cooling circuit
40 first heat exchanger
42 expansion engine
44 second heat exchanger
46 compressor pump
48 generator
50 heat exchanger (superheater)
52 throttle valve
54 vortex cooler
56 cold fluid line
58 hot fluid line
60 swirl chamber
62 conical nozzle
64 blower
66 steam turbine
68 generator
80 feeding line
82 return line
90 depressurization and cooling system

The invention claimed is:

1. A depressurization and cooling system for steam and other condensable gases disposed in an atmosphere within a containment, the depressurization and cooling system comprising:
an exhaust line;
a steam condenser having a backfeed line with a backfeed compressor, an upstream port connected to the containment through said exhaust line and a downstream port connected to the containment through said backfeed line;
a re-cooling system for re-cooling said steam condenser, said re-cooling system having a closed-loop working fluid thermodynamic cycle system, wherein said steam condenser is a heat source, said re-cooling system having along said closed-loop working fluid thermodynamic cycle system:
a first heat exchanger thermally coupled to said steam condenser;
an expansion engine fluidly connected to said first heat exchanger;
a second heat exchanger fluidly connected to said expansion engine;
a compressor pump fluidly connected downstream from said second heat exchanger and upstream from said first heat exchanger;
said expansion engine powering said compressor pump;
a superheater connected downstream from said first heat exchanger and upstream from said expansion engine, wherein said superheater is thermally coupled to said exhaust line such that said superheater is heated by exhaust stream.

2. The depressurization and cooling system according to claim 1, wherein said exhaust line has a recombiner unit upstream from said steam condenser.

3. The depressurization and cooling system according to claim 1, wherein said re-cooling system has a vortex cooler fluidly connected downstream from said compressor pump and upstream from said first heat exchanger.

4. The depressurization and cooling system according to claim 3, wherein said vortex cooler has a hot-fluid outlet which is fluidly connected in a region of said re-cooling system downstream from said first heat exchanger and upstream from said expansion engine.

5. A containment protection system for a nuclear power plant having a containment, the containment protection system comprising:
an exhaust line for a containment atmosphere exhaust stream being connected to the containment;
a steam condenser being switched into said exhaust line;
a backfeed line for a gaseous portion of the containment atmosphere exhaust stream leading from said steam condenser to the containment;
a backfeed compressor being switched into said backfeed line;

a cooling circuit for re-cooling said steam condenser, said cooling circuit containing:
  a first heat exchanger thermally coupled to said steam condenser;
  an expansion engine;
  a compressor pump;
  a heat sink;
  a second heat exchanger thermally coupled to said heat sink;
  said expansion engine powering said compressor pump; and
  a superheater disposed between said first heat exchanger and said expansion engine, said superheater is thermally coupled to said exhaust line such that said superheater is heated by the containment atmosphere exhaust stream.

6. The containment protection system according to claim 5, further comprising a recombiner unit being switched into said exhaust line upstream of said steam condenser.

7. The containment protection system according to claim 5, wherein said second heat exchanger is realized as an air cooler.

8. The containment protection system according to claim 5, wherein said expansion engine is a steam turbine.

9. The containment protection system according to claim 5, wherein said expansion engine and said compressor pump are mechanically coupled to each other.

10. The containment protection system according to claim 5,
  further comprising a blower being directed toward said second heat exchanger; and
  wherein said expansion engine powers said blower.

11. The containment protection system according to claim 5, wherein said expansion engine powers said backfeed compressor.

12. The containment protection system according to claim 5, wherein the containment protection system being configured for zero-release of radioactive substances into the environment.

13. The containment protection system according to claim 5, further comprising a vortex cooler disposed in said cooling circuit between said compressor pump and said first heat exchanger.

14. The containment protection system according to claim 13, wherein said vortex cooler has a hot-fluid outlet which is fluidly connected to said cooling circuit in a region between said first heat exchanger and said expansion engine.

15. The containment protection system according to claim 5, wherein said cooling circuit is configured for a circulation of a cooling medium in a super-critical state.

16. The containment protection system according to claim 15, wherein the cooling medium has a boiling temperature below 100° C.

17. The containment protection system according to claim 15, wherein the cooling medium is carbon dioxide.

18. The containment protection system according to claim 15, wherein the cooling medium has a boiling temperature below 80° C.

19. A nuclear power plant, comprising:
  a containment; and
  a depressurization and cooling system according to claim 1 or a containment protection system according to claim 5.

* * * * *